United States Patent [19]

Helwig et al.

[11] Patent Number: 4,824,608

[45] Date of Patent: Apr. 25, 1989

[54] PREPARATION OF C.I. VAT BLUE 16

[75] Inventors: Reinhard Helwig, Gruenstadt; Helmut Hoch, Wachenheim, both of Fed. Rep. of Germany

[73] Assignee: BASF Aktiengesellschaft, Ludwigshafen, Fed. Rep. of Germany

[21] Appl. No.: 91,846

[22] Filed: Sep. 1, 1987

[30] Foreign Application Priority Data

Sep. 12, 1986 [DE] Fed. Rep. of Germany ....... 3631072

[51] Int. Cl.⁴ .................................................. C09B 3/22
[52] U.S. Cl. .................................................. 260/355
[58] Field of Search ...................................... 260/355

[56] References Cited

U.S. PATENT DOCUMENTS

| | | | |
|---|---|---|---|
| 1,761,624 | 6/1930 | Gubelmann et al. | 260/355 |
| 1,950,366 | 3/1934 | Stallmann | 260/355 |
| 2,140,455 | 12/1938 | Howell | 260/355 |
| 2,781,362 | 2/1957 | Von | 260/355 |
| 3,036,095 | 5/1962 | Moran | 260/355 |

FOREIGN PATENT DOCUMENTS

| | | | |
|---|---|---|---|
| 451122 | 9/1927 | Fed. Rep. of Germany | 260/355 |
| 456582 | 2/1928 | Fed. Rep. of Germany | 260/355 |
| 2001093 | 1/1979 | United Kingdom | 260/355 |

OTHER PUBLICATIONS

Chemical Abstracts, vol. 42, 6119b.

Primary Examiner—Richard L. Raymond
Assistant Examiner—Raymond Covington
Attorney, Agent, or Firm—Oblon, Fisher, Spivak, McClelland & Maier

[57] ABSTRACT

The dye is obtained by alkylating 16,17-dihydroxyviolanthrene-5,10-dione in a tertiary aliphatic or cycloaliphatic amine as solvent at from 100° to 230° C. in high yield and high purity.

11 Claims, No Drawings

PREPARATION OF C.I. VAT BLUE 16

C.I. Vat Blue 16, (C.I. No. 71200) is a navy dye which has long been known and can be prepared by various methods. The relevant prior art includes, for example: the reaction of 16,17-dihydroxyviolanthrene-5,10-dione, also referred to as dioxydibenzanthrone, with glycolditoluenesulfonate or 2-chloroethyl toluenesulfonate in the presence of an alkali metal salt of a weak acid in trichlorobenzene (German Pat. Nos. 451,122 and 456,582); the reaction of dioxydibenzanthrone with ethylene bromide in the presence of an alkali metal salt of a weak acid in nitrobenzene (U.S. Pat. Nos. 1,761,624, 1,950,366 and 3,036,095) or in trichlorobenzene (J. Soc. Chem. Ind. Japan 46 (1943), 1256–1258, reported in C.A. 42, 6119 b); the reaction of the potassium salt of dioxydibenzanthrone with di-($\beta$-chloroethyl) sulfate in the presence of potassium carbonate in nitrobenzene (U.S. Pat. No. 2,140,455) and the reaction of dioxydibenzanthrone with ethylene chloride or bromide in the presence of an alkali metal salt of a weak acid in a dipolar aprotic solvent (German Laid-Open Application DOS No. 2,830,881).

This and similar processes are disadvantageous from the ecological point of view. They require either the handling of haloaromatic hydrocarbons, such as di- or trichlorobenzene, which are difficult to separate from the product, the washwater and the waste air and undergo biological degradation with difficulty, or they employ nitrobenzene as a solvent, which is more readily biodegradable but harmful to health. Nitrobenzene also has the disadvantage that the desired reaction is difficult to carry out to completion.

The process described in German Laid-Open Application DOS No. 2,830,881 avoids these problems by using a dipolar aprotic solvent; however, this solvent is obtained in the form of a mixture with water after the reaction mixture has been worked up. The dipolar aprotic solvents can be regenerated from this mixture only at great expense and then only very incompletely, if they can be regenerated at all. Other disadvantages of this process are the somewhat lower yield of dye compared to the prior art and the relatively high price of the dipolar aprotic solvents used.

It is an object of the present invention to provide a process for the preparation of C.I. Vat Blue 16, C.I. No. 71200, which does not have the ecological disadvantages of the abovementioned processes.

We have found that this object is achieved by a process for the preparation of C.I. Vat Blue 16, C.I. No. 71200, by alkylating 16,17-dihydroxyviolanthrene-5,10-dione in a polar solvent at elevated temperatures, wherein the alkylation is carried out in a tertiary aliphatic or cycloaliphatic amine or an N-alkylpiperidine as the solvent at from 100° to 230° C.

The process according to the invention avoids the abovementioned disadvantages by using, as solvents, liquids which are readily biodegradable and can be readily regenerated and easily washed out from the waste air, and in which the desired reaction takes place rapidly and completely. Solvents of this type based on tertiary aliphatic or cycloaliphatic amines furthermore have the advantage that they obviate the addition of reducing agents, such as dimethylaniline, which is required in the prior art processes. Moreover, because of their basic properties, they make the large ballast of basic alkali metal salts superfluous or dramatically reduce the amount of these salts. Such alkali metal salts are not necessary for the reaction but have to be added in limited amounts if it is intended to recover as completely as possible the amine used as a solvent. For this purpose, the basic alkali metal salts can be added before or after the alkylation. Finally, other advantages of the novel process are the 5–10% higher yield of dye compared with the prior art and the high purity of the dye.

Suitable tertiary amines in the present process are those which are sparingly soluble in water.

Preferred tertiary amines are those whose boiling point is the same as the reaction temperature required for the alkylation or higher than this.

Suitable aliphatic tertiary amines for processes according to the invention are those containing one or more $C_3$–$C_{10}$-alkyl radicals and a total of not less than 9 carbon atoms, specific examples being: tri-n-propylamine, triisopropylamine, N,N-dimethyl-2-ethylhexylamine, tri-n-butylamine, triisobutylamine, N,N-dimethyl-n-decylamine, N,N-dimethyl-n-dodecylamine, tri-n-pentylamine, triisopentylamine, tri-3-methylbutylamine, bis-(2-ethylhexyl)-methylamine, tri-n-hexylamine, bis-(2-ethylhexyl)-butylamine, bis-(2-ethylhexyl)-isobutylamine, tri-n-heptylamine, tri-n-octylamine and tri-2-ethylhexylamine.

Particularly suitable tertiary cycloaliphatic amines are N,N-$C_1$–$C_4$-dialkylcyclohexylamines and N-$C_1$–$C_4$-alkyldicyclohexylamines, eg. cyclohexyldimethylamine, cyclohexyldiethylamine, methyldicyclohexylamine and ethyldicyclohexylamine. N-$C_1$–$C_8$-alkyl-piperidines, such as N-pentylpiperidine or N-hexylpiperidine, are also suitable.

Preferred amines are those containing n-alkyl radicals. Among the stated amines, tri-n-butylamine is a particularly noteworthy solvent.

The amount of tertiary amine used as the solvent is such that the mixture can easily be mixed before, during and after the alkylation. In general, from 2.5 to 10, preferably from 2.6 to 7, in particular from 3 to 5, parts by weight of the tertiary amine are used per part by weight of 16,17-dihydroxyviolanthrene-5,10-dione(I). The alkylation can also be carried out in an excess of more than 10 times the weight of tertiary amine, based on (I). However, this has no advantages for the alkylation of (I).

Suitable alkylating agents are those used in the prior art processes, for example 2-chloroethyl o- and p-toluenesulfonate, 2-chloroethyl benzenesulfonate, glycol bis-o-toluenesulfonate, glycol bis-p-toluenesulfonate, glycol bis-benzenesulfonate, 1,2-dibromoethane, 1,2-dichloroethane or mixtures of these.

The reaction is preferably carried out in tri-n-butylamine. 2-Chloroethyl o- or p-toluenesulfonate, 2-chloroethyl benzenesulfonate, 1,2-dibromoethane or a mixture of these is preferably used as the alkylating agent.

The alkylation is carried out as a rule at from 100° to 230° C., preferably from 120° to 200° C.

The alkylation can be carried out in various ways. The alkylating agent can be added at room temperature before the reaction, or after the mixture has been heated to the desired reaction temperature. It can also be added during heating, at an intermediate temperature.

The reaction mixture can be worked up, for example, by evaporating the entire reaction mixture to dryness, preferably under reduced pressure, and freeing the solid residue from alkali metal and ammonium salts and other impurities by thorough stirring with water. However, the product can also be isolated by filtration or filtration under suction, water advantageously being added to the reaction mixture beforehand. In this case, the basic alkali metal salt can also be added to the reaction mixture together with the water. Residual adhering amine can be removed by treatment with hot water, steam or dilute acids, for example dilute sulfuric acid.

The embodiments which follow illustrate the novel process.

EXAMPLE 1

2,000 g of tributylamine, 240 g of anhydrous sodium carbonate and 500 g of dioxydibenzanthrone are heated to 150° C. in the course of 1 hour under a slow stream of nitrogen in a 6 l vessel having a descending condenser, and distillate which passes over is collected. Thereafter, 700 g of a mixture of 2-chloroethyl o- and p-toluenesulfonate are added dropwise, after which the temperature is slowly increased to 180°–185° C., distillate which passes over once again being collected. The nitrogen is then shut off, the descending condenser is replaced with a reflux condenser, and stirring is continued for 2 hours at 180°–185° C. The mixture is cooled to 80° C., after which 1.5 l of water are run in. The dye is then filtered off under suction, washed with hot water, 10% strength sulfuric acid and water and dried.

Yield: 568 g of dye.

The same result is obtained if 1,500 g or 4,000 g of tributylamine are used instead of 2,000 g of tributylamine.

In order to obtain, by the prior art processes (U.S. Pat. Nos. 1,950,366 and 3,036,095), the dye in an amount which corresponds in its coloring effect to the amount of dye obtained in the above process, it is necessary to use 530–550 g of dioxydibenzanthrone.

EXAMPLE 2

The procedure described in Example 1 is followed, except that the addition of sodium carbonate is dispensed with.

Yield: 571 g of dye.

EXAMPLE 3

The procedure described in Example 1 is followed, except that the sodium carbonate is only added before the addition of the water.

Yield: 573 g of dye.

EXAMPLE 4

The procedure described in Example 1 is followed, and the reaction mixture is allowed to cool to room temperature and transferred to a paddle dryer. The amine is distilled off under reduced pressure. The dry residue is suspended in water and filtered off under suction, and the residue is washed with 10% strength sulfuric acid and then with water.

Yield: 571 g of dye.

EXAMPLE 5

500 g of dioxydibenzanthrone, 240 g of anhydrous sodium carbonate and 2,000 g of tributylamine are introduced into a 6 l paddle dryer having a switchable reflux condenser and descending condenser. The mixture is heated to 150° C. under the descending condenser, 280 g of a mixture of 2-chloroethyl o- and p-toluenesulfonate are then slowly added dropwise, and the mixture is then heated further to 180°–185° C. and refluxed for 2 hours at this temperature. Reduced pressure is then applied to the descending condenser and the mixture is kept at this temperature until solvent no longer passes over. The solid residue is suspended in water, filtered off under suction and washed with 10% strength sulfuric acid and finally with water.

Yield: 584 g of dye.

The same result is obtained if the sodium carbonate is added before the beginning of the distillation under reduced pressure or is omitted entirely.

EXAMPLE 6

The procedure described in Example 1 is followed, except that 650 g of 2-chloroethyl benzenesulfonate are used instead of a mixture of 2-chloroethyl o- and p-toluenesulfonate.

Yield: 570 g of dye.

EXAMPLE 7

The procedure described in Example 1 is followed, except that triisobutylamine is used instead of tributylamine.

Yield: 570 g of dye.

EXAMPLE 8

2,000 g of tributylamine, 240 g of anhydrous sodium carbonate and 500 g of dioxydibenzanthrone are heated to 150° C. in the course of 1 hour under a slow stream of nitrogen in a 6 l vessel having a descending condenser, and distillate passing over is collected. Thereafter, the mixture is allowed to cool to 120° C., and 770 g of 1,2-dibromoethane are added dropwise at this temperature. The mixture is then slowly heated to 180°–185° C., distillate passing over being collected. The nitrogen is shut off, the descending condenser is replaced with a reflux condenser, and stirring is continued for 2 hours at 180°–185° C. The mixture is then cooled to 80° C., 2 l of water are run in, the dye is filtered off under suction, washed with hot water, with 10% strength sulfuric acid and with water and dried to give 565 g of dye.

EXAMPLES 9 TO 12

The procedure described in Example 1 is followed, except that the amines stated in the Table are used instead of tributylamine.

| Example | tert. amine | Yield of dye |
| --- | --- | --- |
| 9 | tri-n-pentylamine | 572 g |
| 10 | tri-n-hexylamine | 575 g |
| 11 | tri-n-heptylamine | 580 g |
| 12 | tri-n-octylamine | 580 g |

We claim:

1. A process for the preparation of C.I. Vat Blue 16, C.I. No. 71200, comprising alkylating 16,17-dihydroxyviolanthrene-5,10-dione in a polar solvent at elevated temperatures, wherein the alkylation is carried out in a tertiary aliphatic or cycloaliphatic amine or an N-alkylpiperidine as the solvent at from 100° to 230° C.

2. A process as claimed in claim 1, wherein aliphatic tertiary amines having one or more $C_3$–$C_{10}$-alkyl radicals and a total of not less than 9 carbon atoms, N,N-di-$C_1$–$C_4$-alkylcyclohexylamines, N-$C_1$–$C_4$-alkylbiscyclohexylamines or N-$C_1$–$C_8$-alkylpiperidines are used as solvents.

3. A process as claimed in claim 1, wherein tri-n-butylamine is used as the solvent.

4. A process as claimed in claim 1, wherein 2-chloroethyl o-toluenesulfonate, 2-chloroethyl p-toluenesulfonate, 2-chloroethyl benzenesulfonate, 1,2-dibromoethane or a mixture of these agents is used as the alkylating agent.

5. A process as claimed in claim 2, wherein 2-chloroethyl o-toluenesulfonate, 2-chloroethyl p-toluenesulfonate, 2-chloroethyl benzenesulfonate, 1,2-dibromoethane or a mixture of these agents is used as the alkylating agent.

6. A process as claimed in claim 3, wherein 2-chloroethyl o-toluenesulfonate, 2-chloroethyl p-toluenesulfonate, 2-chloroethyl benzenesulfonate, 1,2-dibromoethane or a mixture of these agents is used as the alkylating agent.

7. A process as claimed in claim 1, wherein the alkylation is carried out in the presence of an alkali metal salt of a weak acid.

8. A process as claimed in claim 2, wherein the alkylation is carried out in the presence of an alkali metal salt of a weak acid.

9. A process as claimed in claim 3, wherein the alkylation is carried out in the presence of an alkali metal salt of a weak acid.

10. A process as claimed in claim 5, wherein the alkylation is carried out in the presence of an alkali metal salt of a weak acid.

11. A process as claimed in claim 6, wherein the alkylation is carried out in the presence of an alkali metal salt of a weak acid.

* * * * *